United States Patent [19]

Hungerford, Jr.

[11] Patent Number: 5,048,775
[45] Date of Patent: Sep. 17, 1991

[54] DEVICE FOR SUPPORTING A PLURALITY OF PIPES IN PARALLEL RELATIONSHIP WITHIN A DEFINED SPACE

[76] Inventor: Charles S. Hungerford, Jr., 6 Beechwood Ct., Woodbury, Conn. 06798

[21] Appl. No.: 539,128

[22] Filed: Jun. 18, 1990

[51] Int. Cl.⁵ .............................................. E21F 17/02
[52] U.S. Cl. ................................... 248/62; 248/68.1
[58] Field of Search ..................... 248/49, 58, 59, 62, 248/65, 68.1, 74.1, 74.3; 24/339

[56] References Cited

U.S. PATENT DOCUMENTS

| 3,316,605 | 5/1967 | Tabbert | 248/60 X |
|---|---|---|---|
| 3,523,668 | 8/1970 | Logsdon | 248/59 |
| 3,565,375 | 2/1971 | Babb | 248/59 |
| 3,588,011 | 1/1968 | Peres | 248/68.1 |
| 4,120,473 | 10/1978 | Suk | 248/906 X |
| 4,291,855 | 9/1981 | Schenkel | 24/339 X |
| 4,667,920 | 5/1987 | Kleineberg | 248/68.1 |
| 4,682,747 | 7/1987 | King | 248/68.1 |
| 4,802,646 | 2/1989 | Cattani | 248/74.2 X |
| 4,905,942 | 3/1990 | Moretti | 248/68.1 |

FOREIGN PATENT DOCUMENTS

| 352438 | 1/1990 | European Pat. Off. | 248/74.1 |
|---|---|---|---|
| 97856 | 2/1961 | Norway | 248/74.1 |
| 310777 | 5/1969 | Sweden | 248/68.1 |

*Primary Examiner*—J. Franklin Foss
*Attorney, Agent, or Firm*—Bachman & LaPointe

[57] ABSTRACT

A device for supporting a plurality of pipes or the like in parallel relationship within a defined space comprises a support bracket which receives a plurality of clamping members wherein a support bracket is readily secured to a structural member.

9 Claims, 2 Drawing Sheets

DEVICE FOR SUPPORTING A PLURALITY OF PIPES IN PARALLEL RELATIONSHIP WITHIN A DEFINED SPACE

BACKGROUND OF THE INVENTION

The present invention relates to a device for supporting a plurality of pipes in parallel relationship within a defined space and, more particularly, for supporting pipes within a framing system used in the construction of an enclosure such as a building, house or the like.

When constructing buildings and houses, it is necessary to run plumbing pipes within the framing system which form the walls and/or ceilings and/or floors of the enclosure. Typically, the piping includes two water inlet pipes which are generally in the form of a ½" copper tubing for delivering hot and cold water and a 1¼", 1½" or 2" discharge pipe generally formed of plastic or cast iron for removing waste from the enclosure. Accordingly, these pipes must be incorporated within the volumetric space defined by the framing system which generally consists of parallel headers and footers connected by studs at various lengths. The dimensions of the studs are generally 2×4 which results in a limited volumetric space for locating the plumbing pipes.

One problem which has occurred in constructions to date result from burst or leaking pipes. In an effort to locate the burst or leaking pipe, it is not uncommon to have to remove wall, floor and/or roof sections. In previously known constructions, these pipes generally do not run together in a confined space and thus, finding the location of a faulty pipe is difficult.

Naturally, it would be highly desirable to provide a device for supporting the plumbing pipes within a defined volumetric space in such a manner that all of the pipes are held in a position proximate to each other and thus readily accessible by removing a small portion of the surrounding structure.

Accordingly, it is the principal object of the present invention to provide a device for supporting a plurality of pipes in parallel relationship within a defined space.

It is a particular object of the present invention to provide a device as aforesaid which is readily fixed to a framing system used in the construction of enclosures such as buildings and the like in a manner that the device and pipes lie within the volumetric space defined by the framing system.

It is a still further object of the present invention to provide a support bracket which may be readily assembled with a plurality of pipe clamps and easily fixed to a support member of a framing system. It is a still further object of the present invention to provide a device, system and bracket as aforesaid which is readily assembled in the field and of simple construction and economic to manufacture.

Further objects and advantages of the present invention will appear hereinbelow.

SUMMARY OF THE INVENTION

In accordance with the present invention, the foregoing objects and advantages are readily obtained.

The present invention relates to a device for supporting a plurality of pipes in parallel relationship within a defined space and, more particularly, within a volumetric space defined by a framing system used in the construction of enclosures such as buildings, houses and the like. The present invention is also drawn to a bracket member which is easily assembled to a plurality of pipe clamps for supporting pipes as aforesaid.

In accordance with the present invention, the device for supporting the plurality of pipes in parallel relationship comprises a plurality of pipe clamps which are fixedly mounted on a support bracket. Each of the pipe clamps comprises a base portion having a transverse slot extending along a first axis for receiving a tongue-like portion of the support bracket. A mechanism for clamping the pipe projects from the base of the pipe clamps for supporting pipes along an axis which is substantially parallel to the axis of the transverse slot. The length of the pipe clamp from the bottom of the base to the top of the clamp mechanism is defined by a lateral distance X. The base portion of the pipe clamp further includes a bore extending through the base portion along an axis perpendicular to the axis of the transverse slot and intersects same. The support bracket of the device of the present invention comprises an elongated member having a plurality of tongue members projecting therefrom in spaced apart manner wherein each tongue member is received in the transverse slot of a corresponding pipe clamp whereby all of the pipe clamps lie within the space defined by the lateral dimension X of the largest of the pipe clamps. The tongue members include score lines for readily deforming for securing the pipe clamps thereto. By arranging the pipe clamps on the support bracket in the manner aforesaid, all of the pipe clamps and correspondingly the pipes secured thereby will lie within the volumetric area defined by a framing system used in the construction of an enclosure. By such an arrangement, the pipes are held in a parallel manner, in close proximity to each other whereby all of the pipes are readily accessible in case of need of repair.

DETAILED DESCRIPTION

For purposes of illustration, the invention will be described in terms of a device for supporting plumbing pipes within the walls of a house construction; however, it should be understood that the description is presented merely for illustrating the features of the present invention and in no way described intended to be limited to supporting plumbing pipes within housing structures. As can be appreciated, the device of the present invention is readily usable to support many devices such as cables, conduits, pipes and the like.

Figure 1:
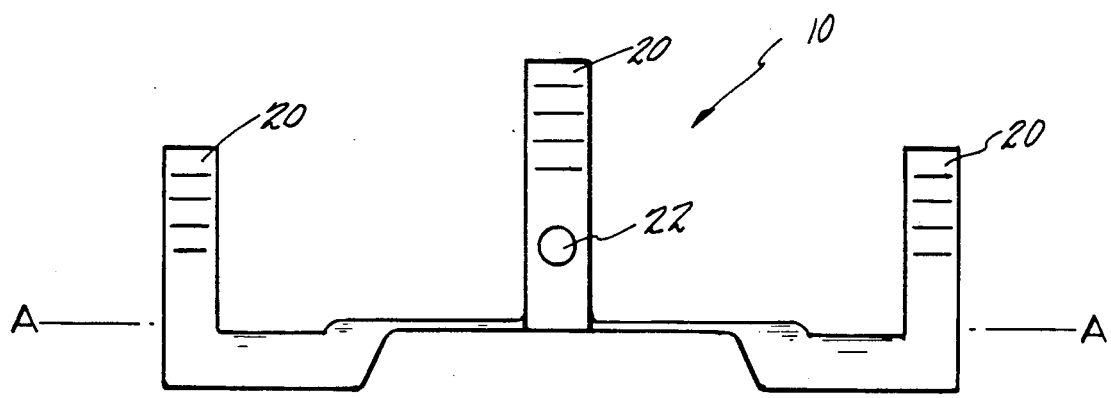
FIG. 1 is a top view of the bracket of the device of the present invention.
Figure 2:
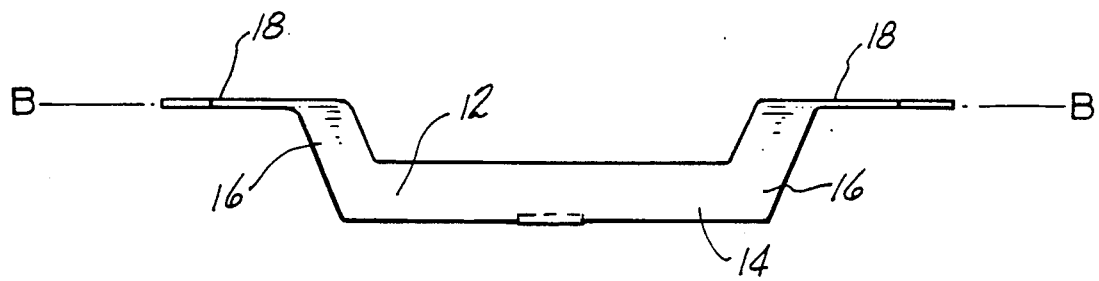
FIG. 2 is a front view of the bracket of the device of the present invention.
Figure 3:
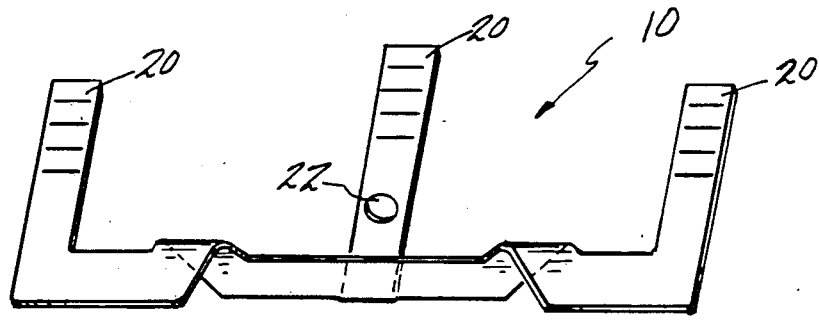
FIG. 3 is a perspective view of the bracket of the present invention.

With reference to the drawings, FIGS. 1-3 illustrate the support bracket used in the device of the present invention, the support bracket 10 comprises a first substantially U-shaped flat portion 12 having a base portion 14 and upwardly extending arm portions 16. The flat substantially U-shaped portion 12 lies along a first plane A—A as shown in FIG. 1. A flat flange 18 extends from each of the arm portions 12 in opposed directions away from the opening defined by base 14 and upwardly extending arms 16. The flat extending flanges 18 lie in a second plane B—B which is substantially perpendicular to the plane on which the U-shaped flat portion lies. A plurality of tongue members 20, three tongue members as shown in FIGS. 1-3, extend from the base portion and the flange portions in a substantially parallel spaced apart manner. The tongue members 20 extend substantially perpendicular from the U-shaped member 12 and flange members 18. In accordance with the present invention, one of the tongue members and preferably the center tongue member is provided with a through bore 22 for reasons to be made clear hereinbelow.

Figure 4:
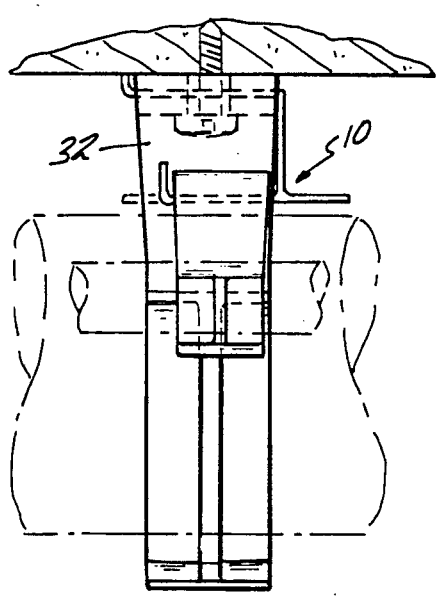
FIG. 4 is a side view of the device of the present invention for supporting a plurality of pipes in parallel relationship wherein the device is secured to a support member.
Figure 7:
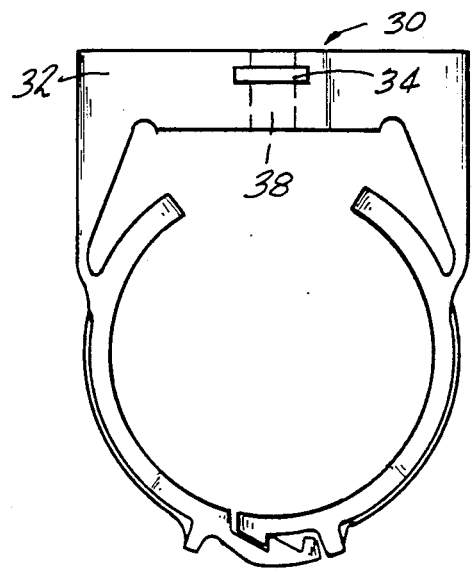
FIG. 7 is a frontal view of the pipe clamp used with the bracket of the present invention.
Figure 5:
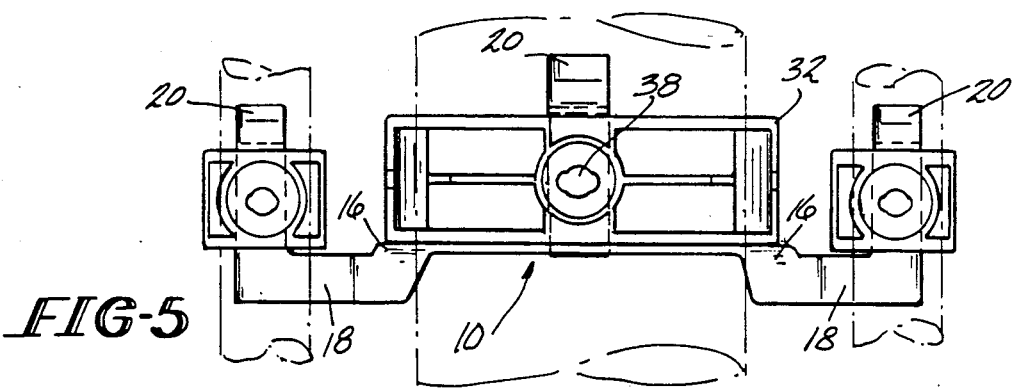
FIG. 5 is a bottom view of the device of the present invention.
Figure 6:
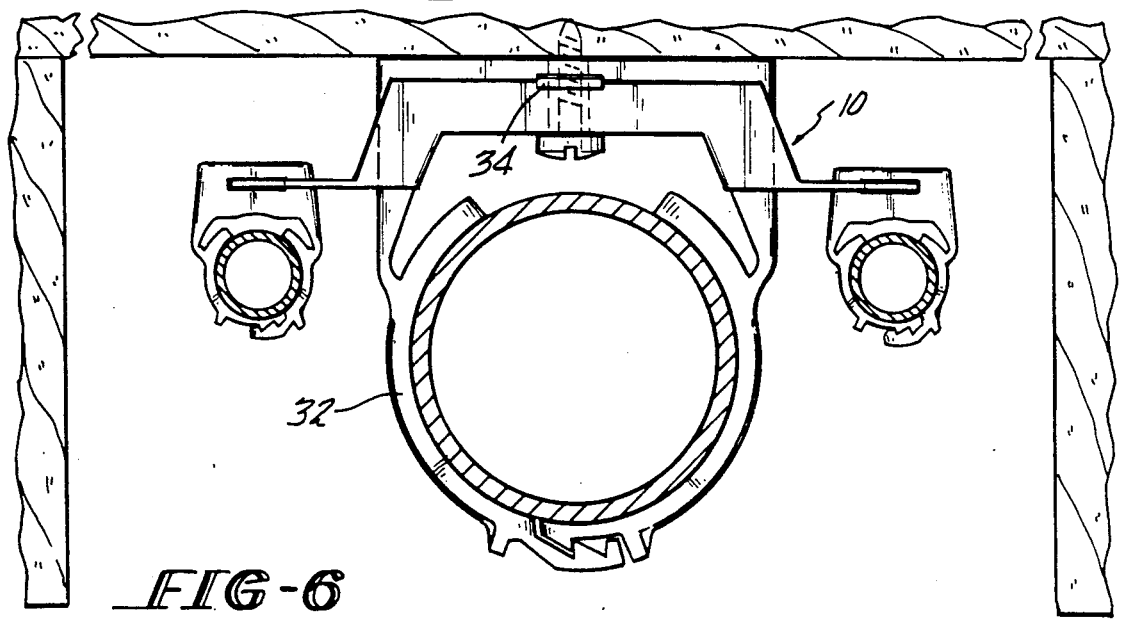
FIG. 6 is a frontal view of the device of the present invention showing the pipes within the volumetric space defined by a framing system.

In the device of the present invention, the support bracket is used in combination with a plurality of clamps for holding the elements to be suspended within a framing system. With reference to FIGS. 4-6, the device of the present invention is illustrated in detail showing how the device is incorporated within the framing system of a house or the like. With reference to the figures, the clamps 30 are provided with a base portion 32. The base portion has a transverse slot 34 extending therethrough along a first axis. The clamp further includes a clamping portion generally designated by reference numeral 36 for releasably clamping an element so as to hold the element along a second axis which is substantially parallel to the axis of the transverse slot. The base member is further provided with a bore 38 extending therethrough in a substantially perpendicular manner to the axis of the transverse slot 34 and intersects the transverse slot. The clamp used in the device of the present invention is described in more detail in U.S. Pat. No. 4,291,855 the disclosure of which is incorporated herein by reference.

With reference to FIGS. 4-6, the tongue members 20 of the support bracket 12 are received within transverse slots provided within the base of the clamps. The tongue members are provided with score lines 24 which allow the end of the tongue which projects through the transverse slot of the base of the clamps to be bent up as illustrated in FIG. 4 for securing the clamp to the bracket member. In its secured position, the through bore 22 on tongue 20 mates with the bore provided in the base which allows for the device of the present invention to be secured to a support structure of the framing system by means of a fastener such as a screw or the like.

In accordance with a particular feature of the present invention as clearly illustrated in FIG. 6, all of the clamps supported by the support bracket lie within the lateral dimension X which extends from the bottom of the base 32 to the top of the clamping member 36. This lateral dimension X lies within the volumetric space defined by the support members of the framing system. In addition, all of the pipes are located proximate to each other in proximate relationship and are readily accessible if need be.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for supporting a plurality of elements in parallel relationship within a defined space comprising, in combination: a plurality of clamps fixedly mounted on a support bracket, each of said clamps having a base Portion provided with (1) a transverse slot extending along a first axis, (2) clamping means projecting from the base for releasably clamping an element for holding the element along a second axis substantially parallel to the first axis wherein the lateral dimension from the bottom of the base to the top of the clamping means of at least one of said clamps is X and (3) a bore extending through said base along a third axis substantially perpendicular to said first axis and said second axis such that said bore intersects said slot; said support bracket having an elongated member provided with a plurality of tongue means projecting therefrom in spaced apart manner wherein each of said tongue means is received within and projects through a transverse slot in said clamps, said tongue means includes securing means for securing the clamps thereto such that all of said plurality of clamps lie with a space defined by the lateral dimension X.

2. A device according to claim 1 wherein the tongue means of the, bracket received within the transverse slot of said at least one of said clamps is provided with a through bore which is aligned with the bore in said base when secured thereto.

3. A device according to claim 1 wherein said securing means comprises a score line means on said tongue to facilitate deformation thereof.

4. A device according to claim 2 including fastening means penetrating said bore in said base and said through bore in said tongue for securing said device to a support member.

5. A device according to claim 2 wherein the lateral dimension X of said at least one of said clamps is greater than the lateral dimension of the other clamps.

6. A device according to claim 1 wherein at least one of said tongues is offset from the other tongues.

7. In a framing system used in the construction of an enclosure comprising a pair of horizontal support members connected together by a pair of vertical support members defining therebetween a volumetric space, a device for supporting a plurality of elements within the volumetric space comprising, in combination, a plurality of clamps fixed mounted on a support bracket by means which support said clamps along parallel axes within said volumetric space, said racket including means for securing said device to at least one of said support members wherein each of said clamps has a base portion provided with (1) a transverse slot extending along a first axis, (2) clamping means projecting from the base for releasably clamping an element for holding the element along a second axis substantially parallel to the first axis wherein the lateral dimension from the bottom of the base to the top of the clamping means of at least one of said clamps is X and (3) a bore extending through said base along a third axis substantially perpendicular to said first axis and said second axis such that said bore intersects said slot; said support bracket having an elongated member provided with a plurality of tongue means projecting therefrom in spaced apart manner wherein each of said tongue means is received within and projects through a transverse slot in said clamps, said tongue means includes securing means for securing the clamps thereto such that all of said plurality of clamps lie with a space defined by the lateral dimension X.

8. A bracket for supporting a plurality of clamps fixedly thereon comprising a first substantially U-shaped flat portion lying in a first plane and having a base portion and upwardly extending arm portions defined with said base an opening, a flat flange extending from each of said arm portions in opposed directions away from said opening and lying in a second plane substantially perpendicular to the first plane and at least one tongue member extending from each of said base portions and said flanges in a substantially parallel spaced apart manner.

9. A bracket according to claim 8 wherein said tongue members are each provided with a score line to facilitate bending of the tongue.

* * * * *